Patented Jan. 29, 1935

1,989,632

UNITED STATES PATENT OFFICE 1,989,632

TRANSPARENT FILM

William C. Calvert, Cuyahoga Falls, Ohio, assignor to Wingfoot Corporation, Wilmington, Del., a corporation of Delaware No Drawing. Application December 22, 1933, Serial No. 703,557. In Canada April 20, 1933

11 Claims. (Cl. 106—23)

This invention relates to thermoplastic rubber derivatives. It includes compositions containing them and products made from them. Among the products are coating compositions, coated objects and a sheet or film. The preferred form of sheet or film is a transparent wrapping material which is moisture-proof even tho no thicker than one-thousandth of an inch and which may be sealed merely by the application of heat and pressure. It may be made of a halogen-containing rubber derivative, such as rubber hydrochloride which is stabilized, either by special processing or by admixture with suitable materials, and remains flexible even on prolonged exposure to light.

Rubber is an unsaturated hydrocarbon and as such is capable of reacting additively with various substances which are thought, for the reason that the addition of such substances has been found to decrease the degree of chemical unsaturation of the rubber, to attach themselves at the double bonds of the rubber molecule. Natural rubber, for example such as that from the tree *Hevea brasiliensis* has been determined to have the empirical formula $(C_5H_8)_x$ in which the value of $x$ has not as yet been ascertained but in which there is known to be one double bond for each $C_5H_8$ group.

When rubber is saturated with hydrogen chloride the empirical formula of the material is apparently changed from $(C_5H_8)_x$ to $(C_5H_9Cl)_x$. This product has not the resiliency, flexibility and tear resistance of rubber but is brittle or stiff and inclined to crack on flexing. If only partially saturated with hydrogen chloride so that the product contains about 28% to 30.5% of chlorine a flexible product is obtained, which in this respect at least is markedly different from derivatives made by completely saturating rubber with hydrogen chloride.

Various chlorinated rubbers may be produced. The double bonds may be saturated with chlorine to form a compound with the empirical formula $(C_5H_8Cl_2)_x$ and by substitution chlorinated compounds of varying chlorine content may be obtained. The chlorine may be both substituted and added in the same compound.

Rubber also reacts with other halides and hydrohalides to form related compounds such as rubber hydrobromide and brominated rubbers. The rubber may be both halogenated and hydrohalogenated as a chlorinated rubber hydrochloride. The same rubber compound may contain different halogens combined with the $C_5H_8$ nucleus, as for example, chlorine and iodine or bromine.

Altho various such compounds are described in the literature, until this invention no one had formed a satisfactory sheet wrapping material from any such compound. Altho it was known that chlorinated rubber, for example, could be formed into a transparent film, the film produced did not remain flexible but quickly became brittle on exposure to light. Materials which quickly become brittle in sunlight, altho they may be used for wrapping quickly perishable food stuffs, such as bread, are not generally satisfactory for wrapping.

A wrapping material, as that term is used in the appended claims means a flexible covering material which has sufficient strength to withstand wrapping operations, either manual or mechanical, and to withstand ordinary handling. It must be of such a composition that it will not contaminate the material wrapped. It must be sufficiently stable so that it will not deteriorate rapidly, but will retain its covering properties during storage and subsequent handling. Flexible rubber derivatives, such as halogenated and hydrohalogenated rubber, as ordinarily prepared, rather quickly lose their flexibility and become brittle.

It has now been found that partially saturated rubber hydrochlorides, such as a rubber hydrochloride containing about 29.5% chlorine, can be stabilized by the addition of various photochemical inhibitors so that they remain flexible at least three and as much as ten, or even fifteen or more, times as long as a pure rubber hydrochloride of the same chlorine content. By the addition of suitable stabilizers to other rubber hydrohalides or to other halogen-containing rubber derivatives or by subjecting halogenated rubbers to a stabilizing treatment, compositions which remain flexible over a prolonged period may be obtained from which the wrapping material of this invention may be produced.

The wrapping material of the present invention may be made of a rubber hydrochloride which is not a saturated rubber hydrochloride but a partially saturated rubber hydrochloride containing about 29–30.5% of chlorine. Rubber hydrochlorides which contain more than 30.5% of chlorine are brittle or stiff and inclined to crack on flexing, and those which contain less than 28 or 29% of chlorine are soft and sticky at room temperatures. Unless compounded with waxes or resins or other suitable materials, rubber hydrochlorides containing more than about 30.5% chlorine or less than about 28 or 29% chlorine are in general not suited for the manufacture of wrapping material. Rubber hydrochlorides which contain 29–30.5% of chlorine are, when formed into a thin film, as described below, clear, substantially colorless, transparent, flexible, extensible to a slight degree and highly resistant to tear and, when stabilized, form a desirable wrapping material. Such a film has a low flammability, burning very slowly with a low flame. It is resistant to water, moderately concentrated acids and alkalis, mineral and vegetable oils and most organic solvents. It is not tacky at ordinary temperatures and wholly different from the rubber from which it is prepared. It softens somewhat and becomes sticky at temperatures in excess of 110° C., a property which is valuable in that it permits films to be spliced together and packages to be sealed by means of a hot roller or other similar application of heat and pressure. Splicing may also be effected by the use of solvents, such as benzene, or chloroform or a cement formed by dissolving rubber hydrochloride in such a solvent. The films may be colored by soluble dyes, such as oil soluble dyes if desired, and also by insoluble coloring ingredients if a clear transparent film is not required. Also they may be printed with inks ordinarily used for this type of work. They may be embossed to give pleasing surface finishes.

The pure, partially saturated rubber hydrochloride from which the films of this invention are preferably made, on exposure to sunlight or other light rich in ultra violet rays, becomes brittle too rapidly to be used by itself as a wrapping material. However, it has now been found that such rubber hydrochlorides can be made to remain flexible over a prolonged period of time by incorporating photochemical inhibitors. Certain of the inhibitors mentioned herein prolong the life of the film as much as ten or fifteen times or longer, and a rubber hydrochloride film containing 29.5% chlorine and a mixture of 1½% of hexamethylene tetramine and 3% of dicyclohexylamine has been found to retain its flexibility after fifty-six days' exposure thru glass to Los Angeles, California summer sunshine. When not exposed to the direct rays of the sun it remains flexible for a much longer time and is entirely suitable for packaging cigarettes, cigars, edibles of all kinds such as bread, candies, etc. in boxes and individually and all sorts of articles for display purposes.

It appears that the change which occurs in the rubber hydrochlorides when exposed to the sunlight is some form of oxidation. Whatever the cause or nature of the change, the fact is that these photochemical inhibitors retard or inhibit some action induced or hastened by the sunlight which causes flexible rubber hydrochlorides which are not protected by an inhibitor to become brittle. The inhibitors appear to prevent a similar change from taking place in the more saturated brittle hydrochlorides when exposed to sunlight. In general, the inhibitors prevent a rapid decrease in the tear-resistance and tensile and impact strengths of flexible rubber hydrochloride films on exposure to sunlight. Certain of them also increase the life and otherwise affect the properties of rubber hydrochloride films, etc. used or stored in places where they receive little or no sunlight.

Moisture tests show that rubber hydrochloride films are moisture-proof to a high degree. The tests were carried out in a box equipped with a fan to circulate the air over containers of 95% sulfuric acid in the box and maintain uniform humidity. The temperature was maintained at 39.5° C. by thermostatic control. Each sample of the film tested was laid on a glass plate. A 35 mm. diameter crucible containing 10 cc. of water at 60° C. was placed on the film. A crystallizing dish 70 mm. in diameter and 50 mm. deep was dipped about 5 mm. deep in melted beeswax and inverted over the crucible on the film. When the beeswax had hardened the dish was turned over, emptying the water from the crucible into the dish. The edges of the film were trimmed to about 8 mm. from the edge of the dish, slit at about 5 mm. intervals, and the edges fastened to the outer wall of the dish with beeswax. The unit so prepared was weighed, placed in the box for a definite period, and then removed and reweighed to determine the loss of water.

Many samples of rubber hydrochloride films about .001 inch thick containing different inhibitors have been tested in this box. In general the moisture transmission has been under 20 grams of water per square meter for 24 hours, and moisture transmission as low as 10 grams, and even 7 grams has been found in certain films. Tests run for two consecutive 24-hour periods show no increase in moisture transmission during the second twenty-four hour period. The moisture-proofness of a flexible rubber hydrochloride film is affected little, if any, by creasing. Seams of packages formed by heat-sealing the edges of the film together are substantially as moisture-proof as the film itself.

The addition of the photochemical inhibitors appears to have no radical effect on the flammability or moisture transmission of films. Plasticizers may affect these properties quite materially, without rendering the films unsuitable as wrapping materials. The judicious use of plasticizers may improve the film as a wrapping material for special purposes or for general use.

The partially saturated rubber hydrochloride may be prepared as follows: 20 pounds of plasticized pale crepe rubber are dissolved in about 313 pounds of benzene, giving a rubber cement of approximately 6% concentration. Commercial benzene containing up to 0.1% of water may be used. Dehydrated benzene gives a somewhat lighter colored film, altho in either case a substantially colorless film may be obtained. The cement is preferably cooled to about 10° C. and hydrogen chloride gas introduced, the cement being meanwhile agitated. The hydrogen chloride may be introduced at a higher temperature if desired, for example, at room temperature, but it is preferable to carry out the reaction at about 10° C., as the gas is more readily dissolved in the cement at this temperature. After passing the gas into the solution for about six hours, the increase in weight of the composition due to the introduction of hydrogen chloride should be approximately 11.6 pounds which corresponds to a slight excess of available hydrogen chloride over that theoretically required by the empirical formula $(C_5H_9Cl)_x$, and when this increase in weight has been effected the introduction of hydrogen chloride gas into the cement is advantageously discontinued. If more hydrogen chloride is introduced the time required for the reaction of the hydrogen chloride and rubber is shortened but in most commercial operations this will not be advantageous.

The hydrogen chloride dissolved in the cement is allowed to react with the rubber at room temperature until the desired hydrochlorination has been effected. Generally about 20 hours will be required to produce 80 to 90% saturation of the rubber. Introducing an excess of hydrogen chloride ranging upward to about 50% over that theoretically necessary to obtain the desired partial saturation of the rubber is helpful in achieving the desired change in the rubber in a somewhat shorter time, but in general a prolonged period of standing will be found to be necessary. The test for completion of the desired saturation may be an analysis for chlorine or an empirical test such as a determination of the viscosity of the rubber hydrochloride or a determination of the stress/strain properties of a film prepared from the reaction product or a visual and manual examination of a film prepared from the mass to determine whether or not it is tacky or brittle on drying.

After the desired partial saturation has been achieved, the excess hydrogen chloride may be neutralized with ammonia or other alkali and the photochemical inhibitor added directly to the neutralized solution and the film prepared from this. A somewhat clearer film is obtained if water-soluble materials are first removed from the rubber hydrochloride.

Other methods may be employed for removing the excess hydrogen chloride, one being to bubble nitrogen thru the reacted cement, the nitrogen taking the free hydrogen chloride with it. Another is to employ selective solvents. In some cases, it may be found desirable to remove the hydrogen chloride by precipitating it out as a salt. Still other methods of purification may be utilized if desired.

According to one method of preparing a film, the reacted cement, after standing a sufficient time to effect the desired hydrochlorination of the rubber is subjected to steam distillation to remove the solvent and excess hydrogen chloride. The resulting mass of the partially saturated rubber hydrochloride is then broken up on a rubber washer, washed thoroughly with water to remove any remaining hydrogen chloride and water-soluble material and dried in a vacuum drier at approximately 160° F. The dried product is then dissolved in chloroform, about 20 parts of solvent to one part of the rubber hydrochloride being satisfactory. Other solvents, for example, benzene, may be employed if the materials are heated. Solvents such as dichlorethylene may be used without heating. To the resulting solution a suitable photochemical inhibitor is added. If the inhibitor is a mixture of compounds, the individual compounds may be added separately or together. The inhibitor may be added at an earlier stage of the process if it is not affected by the subsequent steps in the production of the film. It should be a high boiling compound and unless the film is to be colored as by the addition of dyestuffs, it should be colorless and a compound or mixture which, if it decomposes during the life of the film, will not discolor the film. Aliphatic compounds and saturated ring compounds are preferred as inhibitors and secondary and tertiary aliphatic, alicyclic and heterocyclic amines, particularly compounds containing the general grouping

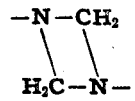

have been found very effective. Rubber hydrochloride films in which the following compounds have been incorporated in the proportions indicated, which are per cent by weight of the rubber hydrochloride, have been found to remain flexible much longer than films of the same rubber hydrochloride to which nothing has been added:

.5% Hexamethylene tetramine
1.0% Hexamethylene tetramine
1.5% Hexamethylene tetramine
3% Dicyclohexylamine
10% Dicyclohexylamine
12% Dicyclohexylamine
2% Ditetrahydrofurfurylamine
3% Ditetrahydrofurfurylamine
4% Ditetrahydrofurfurylamine
2% Methyleneaminoacetonitrile
3% Methyleneaminoacetonitrile
2% Cyclohexylamine-formaldehyde
4% Cyclohexylamine-formaldehyde
6% Cyclohexylamine-formaldehyde
8% Cyclohexylamine-formaldehyde
10% Cyclohexylamine-formaldehyde
12% Cyclohexylamine-formaldehyde
2% Cyclohexylamino-acetonitrile
4% Cyclohexylamino-acetonitrile
5% Cyclohexylamino-acetonitrile
3% Tetramethyl thiuram disulfide
5% Diphenylguanidine
3% Dihydroxy diphenyl propane The following mixtures of compounds have given satisfactory results:

1½% Hexamethylene tetramine
3% Methyleneamino-acetonitrile

.5% Hexamethylene tetramine
3% Ditetrahydrofurfurylamine

1% Hexamethylene tetramine
1% Ditetrahydrofurfurylamine

1% Hexamethylene tetramine
2% Ditetrahydrofurfurylamine

1% Hexamethylene tetramine
3% Ditetrahydrofurfurylamine

1½% Hexamethylene tetramine
1% Ditetrahydrofurfurylamine

1½% Hexamethylene tetramine
2% Ditetrahydrofurfurylamine

1½% Hexamethylene tetramine
3% Ditetrahydrofurfurylamine

1% Hexamethylene tetramine
3% Dicyclohexylamine

1½% Hexamethylene tetramine
1% Dicyclohexylamine

1½% Hexamethylene tetramine
2% Dicyclohexylamine

1½% Hexamethylene tetramine
3% Dicyclohexylamine

1½% Hexamethylene tetramine
1% Dicyclohexylamine

1% Ditetrahydrofurfurylamine
1½% Hexamethylene tetramine

1% Dicyclohexylamine
2% Ditetrahydrofurfurylamine

1½% Hexamethylene tetramine
2% Dicyclohexylamine

1% Ditetrahydrofurfurylamine
1½% Hexamethylene tetramine

1½% Dicyclohexylamine
1½% Ditetrahydrofurfurylamine

Cyclohexylamine formaldehyde may be prepared by crystallization from a solution of equimolar quantities of formaldehyde and cyclohexylamine in a solvent.

From the solution of the partially saturated rubber hydrochloride and photochemical inhibitor to which plasticizers as desired may be added in any suitable amount, a film is prepared by any suitable means. Satisfactory results have been obtained by spreading the solution on a nitrocellulose-coated belt and then evaporating the solvent by circulating warm air over the surface, stripping the resulting film from the belt after substantially all of the solvent has been evaporated and subsequently evaporating the balance of the solvent. A belt with a coating of approximately equal parts of cellulose acetate and 2:1 ethylene glycol-phthalic anhydride condensate may likewise be used. The solution may be sprayed or extruded onto any suitable smooth surface, such as glass, etc. in producing the film, if desired. The thickness of the film may be varied.

The film so produced is similar in appearance to the transparent cellulosic film known to the trade as Cellophane. It is, however, much more resistant to moisture than this film and for most purposes is therefore a more advantageous wrapping material. The moisture-proof quality of cellophane and many of the other films in commercial use is reduced or destroyed when the films are wrinkled or creased, as for example, when the films are folded in wrapping an article. The film of the present invention is very flexible and is substantially as resistant to moisture after creasing and wrinkling as before.

It is to be understood that many variations may be made in the steps of the process of preparing the film and different materials may be employed. For instance, altho pale crepe rubber will generally be found to be particularly suitable to the practice of the invention, other types of rubber may be employed. Benzene, chloroform, carbon tetrachloride, carbon bisulfide or other suitable solvents may be used in forming the rubber cement. Chloroform, dichlorethylene and other solvents may be used in dissolving the rubber hydrochloride for the preparation of the film. The concentration of the rubber solution used in forming the film may be varied within reasonable limits. Altho for wrapping purposes, a film .001 inch thick will be most suitable, films or sheets of .0005 to .002 inches or thinner or thicker may be made.

An alternative method of producing the film comprises treating a seven per cent solution of pale crepe rubber in benzene at room temperature with dry hydrogen chloride gas which may advantageously be saturated with benzene, and continuing the treatment until the increase in weight is approximately five per cent. The introduction of hydrogen chloride is then discontinued and the cement is aged for a period of about twenty hours. The reacted cement is then poured into alcohol, allowed to harden, washed with water until all the hydrogen chloride is removed, and dried in a vacuum drier or other suitable apparatus. It is then dissolved in chloroform to form a seven per cent cement, to which two per cent of methylene amino aceto nitrile, based on the rubber hydrochloride content, are added. The film is formed from this cement in any desired manner.

Altho in preparing the film from rubber hydrochloride the saturation of the rubber with hydrogen chloride may vary between 85 and 90%, a film which is approximately 88% saturated has been found to be unusually satisfactory and constitutes a preferred form of the invention. Rubber which has been incompletely saturated with other hydrohalides such as hydrogen bromide, also may be made into flexible films which may be stabilized as herein described to form wrapping materials. More saturated compounds may be mixed with paraffin, etc., to give a film of the required flexibility, etc. Materials such as paraffin, etc., may be added to a rubber hydrochloride of 29 to 30.5% chlorine content to form a film having increased resistance to water or to otherwise modify its properties. Waxes, resins, etc., may be added to other halogenated or hydrohalogenated rubber compounds in preparing the wrapping material of this invention.

A solution of the partially saturated rubber hydrochloride and a photochemical inhibitor makes a very desirable composition for coating paper and other fibrous materials to make them moisture-resistant and oil-proof. A suitable inhibitor may be added directly to the reacted cement or neutralized cement to form such a coating composition. A clearer coating is formed by first steam-distilling the reacted cement to remove the solvent and excess hydrogen chloride, washing the resulting mass with water on a rubber mill, and then dissolving the washed product and flexibility-preserver in chloroform or other solvent.

Paper, textile fabrics, etc. may be dipped into the coating composition or the coating composition may be applied to the fabric on a spreader or other suitable device. Fabricated paper articles, such as containers, etc. may be sprayed with the coating composition or dipped into a batch of the coating composition. Paper coated with a stabilized, partially saturated rubber hydrochloride may be used in the manufacture of oil-proof containers, etc. Paper of suitable thickness coated on one or both sides, cut to the proper size, makes a very satisfactory milk-bottle cap. Coated products are described and claimed in my co-pending application, Serial No. 755,389, filed November 30, 1934.

Films of the stabilized rubber hydrochloride or a cement of the stabilized rubber hydrochloride may be employed for joining laminations of glass as in shatter-proof windshields and the like.

It has been found that the photochemical inhibitors mentioned herein have a stabilizing effect on rubber derivatives of varying hydrochloride content. The invention is therefore not limited to the use of such compounds with flexible rubber hydrohalides, but includes the use of these compounds as stabilizers in saturated brittle compounds whether used alone or with plasticizers, etc.

This application is in part a continuation of my application Serial No. 652,686, filed January 20, 1933.

What I claim is:

1. A composition of matter which includes a rubber hydrohalide and a substance of such character and in such an amount as to retard photochemical disintegration of the rubber hydrohalide.

2. A composition of matter which includes a rubber hydrochloride and hexamethylene tetramine in such an amount as to retard photochemical disintegration of the rubber hydrochloride.

3. As a new article of manufacture, a homogeneous, thin sheet material or film composed of a partially saturated rubber hydrochloride and a substance of such character and in such an amount as to retard photochemical disintegration of the rubber hydrochloride, said sheet or film being characterized by transparency, flexibility, extensibility and inherent resistance to the passage of moisture vapors, which last-named characteristic is not appreciably affected by creasing or folding.

4. As a new article of manufacture, a thin flexible sheet composed of a rubber hydrochloride and hexamethylene tetramine in such an amount as to retard photochemical disintegration of the rubber hydrochloride.

5. As a new article of manufacture, a thin flexible sheet composed of a rubber hydrohalide and a substance of such character and in such amount as to retard photochemical disintegration of the rubber hydrohalide.

6. As a new article of manufacture a homogeneous, cast thin sheet material or film suitable for use as a wrapping material composed essentially of a chlorine-containing rubber derivative and being characterized by flexibility, transparency, extensibility with no more than a low degree of elasticity, and inherent resistance to the passage of moisture vapor, which last-named characteristic is not appreciably affected by creasing or folding, and further characterized by resistance to photochemical disintegration over a prolonged period of time and being thermoplastic whereby overlapping portions become fused to one another when subjected to heat and pressure.

7. As a new article of manufacture a thin, flexible sheet composed of a rubber hydrochloride and a substance of such character and in such an amount as to retard photochemical disintegration of the rubber hydrochloride.

8. As a new article of manufacture a homogeneous, cast thin sheet material or film suitable for use as a wrapping material composed essentially of a rubber hydrochloride and being characterized by flexibility, transparency, extensibility with no more than a low degree of elasticity, and inherent resistance to the passage of moisture vapor, which last-named characteristic is not appreciably affected by creasing or folding, and further characterized by resistance to photochemical disintegration over a prolonged period of time and being thermoplastic whereby overlapping portions become fused to one another when subjected to heat and pressure.

9. A composition of matter which includes a rubber hydrohalide and a saturated secondary amine of such character and in such an amount as to retard photochemical disintegration of the rubber hydrohalide.

10. A composition of matter which includes a rubber hydrohalide and a substituted dimethylamine of such character and in such an amount as to retard photochemical disintegration of the rubber hydrohalide.

11. A composition of matter which includes a rubber hydrohalide and a chemical compound which contains the grouping

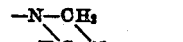

in such an amount as to retard photochemical disintegration of the rubber hydrohalide.

WILLIAM C. CALVERT.